(12) United States Patent
Feierabend et al.

(10) Patent No.: US 6,801,681 B2
(45) Date of Patent: Oct. 5, 2004

(54) OPTICAL SWITCH WITH LOW-INERTIA MICROMIRROR

(75) Inventors: Patrick E. Feierabend, Santa Barbara, CA (US); John S. Foster, Santa Barbara, CA (US); Bryant P. Hichwa, Santa Rosa, CA (US); Richard T. Martin, Goleta, CA (US); Paul J. Rubel, Santa Barbara, CA (US); Kimon Rybnicek, Santa Barbara, CA (US); John W. Stocker, Curpentino, CA (US); Jeffery F. Summers, Santa Barbara, CA (US)

(73) Assignee: Optical Coating Laboratory, Inc., Santa Rosa, CA (US)

(*) Notice: Subject to any disclaimer, the term of this patent is extended or adjusted under 35 U.S.C. 154(b) by 325 days.

(21) Appl. No.: 09/765,520

(22) Filed: Jan. 17, 2001

(65) Prior Publication Data

US 2002/0094152 A1 Jul. 18, 2002

(51) Int. Cl.⁷ .............................. G02B 6/26; G02B 6/42
(52) U.S. Cl. ............................ 385/18; 385/16; 385/19; 359/318; 359/320
(58) Field of Search .............................. 385/16–21, 24; 359/280, 290, 298, 318, 320, 40 MM; 310/40 MM

(56) References Cited

U.S. PATENT DOCUMENTS

| 5,025,346 A | 6/1991 | Tang et al. ................... 361/283 |
| 5,459,602 A | 10/1995 | Sampsell ..................... 359/234 |
| 5,629,918 A | 5/1997 | Ho et al. ..................... 369/112 |
| 5,808,780 A | 9/1998 | McDonald ................... 359/290 |
| 5,933,269 A | 8/1999 | Robinson ..................... 359/280 |
| 5,945,898 A | 8/1999 | Judy et al. ..................... 335/78 |
| 5,995,688 A | 11/1999 | Aksyuk et al. ............... 385/14 |
| 5,998,906 A | 12/1999 | Jermain et al. |
| 6,008,120 A | 12/1999 | Lee ............................ 438/634 |
| 6,031,947 A | 2/2000 | Laor ........................... 385/22 |
| 6,049,404 A | 4/2000 | Wu et al. ..................... 359/117 |
| 6,049,650 A | 4/2000 | Jerman et al. ............... 385/137 |
| 6,072,924 A | 6/2000 | Sato et al. ..................... 385/18 |
| 6,091,867 A | 7/2000 | Young et al. ................. 385/17 |
| 6,094,293 A | 7/2000 | Yokoyama et al. ......... 359/280 |
| 6,097,858 A | 8/2000 | Laor ............................ 385/16 |
| 6,097,860 A | 8/2000 | Laor ............................ 385/17 |
| 6,124,650 A | 9/2000 | Bishop et al. ................ 310/40 |
| 6,128,122 A | 10/2000 | Drake et al. ................. 359/224 |
| 6,229,640 B1 | 5/2001 | Zhang ......................... 359/290 |
| 6,396,619 B1 * | 5/2002 | Huibers et al. ............. 359/291 |
| 6,396,975 B1 * | 5/2002 | Wood et al. ................. 385/18 |
| 2001/0050801 A1 * | 12/2001 | Behin et al. ................ 359/298 |
| 2002/0017834 A1 * | 2/2002 | MacDonald ................ 310/328 |
| 2002/0135864 A1 * | 9/2002 | Chiu et al. ................... 359/318 |

FOREIGN PATENT DOCUMENTS

| WO | WO 00/25160 | 5/2000 | ............ G02B/6/26 |

* cited by examiner

Primary Examiner—Hemang Sanghavi

(57) ABSTRACT

An optical switch is fabricated using micro-electro-mechanical system ("MEMS") techniques. A thin mirror is fabricated in the major plane of the substrate and rotates about an axis perpendicular to the major plane to move into and out of an optical beam path. The mirror surface is open for chemical polishing and deposition, resulting in a high-quality mirror. In one embodiment, the backside of the mirror is patterned with reinforcing ribs. In another embodiment, a two-sided mirror is fabricated.

23 Claims, 6 Drawing Sheets

OPTICAL SWITCH WITH LOW-INERTIA MICROMIRROR

CROSS-REFERENCE TO RELATED APPLICATIONS

This U.S. patent application is being concurrently filed with U.S. patent application Ser. No. 09/765,520 entitled OPTICAL CROSS-CONNECT WITH MAGNETIC MICRO-ELECTRO-MECHANICAL ACTUATOR CELLS, by Hichwa et al.; and U.S. patent application Ser. No. 09/764,919 entitled LOW INERTIA LATCHING MICROACTUATOR by Fejerabend et al.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The invention relates generally to optical switches, and more specifically to a micro-electro-mechanical system ("MEMS") optical switch with a mirror that rotates in the major plane of the device.

The use of optical signal transmission is rapidly growing in the telecommunications ("telecom") industry. In particular, optical transmission techniques are being used for local data transfer ("metro"), as well as point-to-point "long-haul" transmissions. Similarly, the number of optical signals, or channels, carried on an optic fiber is growing. The implementation of wave-division multiplexing ("WDM") has allowed the number of channels carried on a fiber to increase from one to over 16, with further expansions planned.

Thus, the need for optical switching technology is expanding. In the case of WDM technology, an optical channel is removed from a multi-channel fiber with an optical bandpass filter, diffraction grating, or other wavelength-selective device, and routed to one of perhaps several destinations. For example, a channel on a long-haul transmission line might be routed between a local user for a period of time and then switched back onto the long-haul transmission line ("re-inserted"). This is known as 1×2 switching because a single input is switched between one of two possible outputs. As the complexity of optical networks grows, the complexity of the desired switching matrices also grows.

Switching matrices are being developed for several different optical network applications. "Small fabric" applications have been developed using 1×2, 2×2, and 1×8 type switches. However, there is a need for "medium fabric" applications that can provide 8×8 up to and beyond 32×32 type switching arrays, and even for "large fabric" switching arrays that can handle 1024×1024 or more switching applications. The switching arrays that allow any input to be connected to any output are generally called "cross-connects", but in some applications there may be limited switching of some ports.

Unfortunately, attempting to merely scale the techniques developed for small fabric applications may not meet system requirements, such as switching speed, switching array space limitations, and power limitations. In particular, it is often desirable to upgrade an optical network to handle more traffic by adding additional channels onto the installed fiber base, and that the switching arrays be able to fit into the existing "footprint" allowed for the switching matrix. In many cases, the footprint is actually a 3-dimensional restriction. Similar restrictions might apply to the available power, or allowable power dissipation.

Various techniques have been developed to address the problems arising in the development of more complicated switching arrays. Several approaches have adapted photolithographic methods developed primarily for the field of semiconductor processing to the fabrication of optical switching arrays. In one approach, MEMS techniques are used to create a very small motive device (motor), such as an electrostatic comb drive, electrostatic scratch drive, magnetic drive, thermal drive, or the like, attached to an optical switching element, typically a mirror. The mirror is usually either fabricated in the major plane of the process wafer and rotated to become perpendicular to a switchable light signal, or is fabricated perpendicular to the major plane of the wafer. In the first instance, establishing and maintaining verticality of the mirror is very important to insure that the light signal is reflected to the desired output port. In the second instance, fabricating a mirror-smooth surface on a vertical plane of the wafer can be difficult, as can be depositing a reflective metal layer on that surface.

Similar challenges arise from speed and power requirements. Generally, a higher switching speed for a given type of actuator requires greater power. MEMS devices are attractive in that their small size often results in low power consumption, but this may also limit the inertia of the optical element that can be switched within the required period. The inertia can be changed by reducing the mass of the optical element, but this may result in an optical element that is not sufficiently rigid to reliably perform the desired optical switching function.

Thus, a need exists for optical switches that rapidly change states with relatively low power requirements. It is further desirable that such switches have a small size, but yet provide an optical element that achieves low insertion loss.

BRIEF SUMMARY OF THE INVENTION

A ("MEMS") optical switch is formed on an SOI wafer having a silicon substrate separated from a single-crystal silicon superstrate by a thin layer of silicon dioxide. A base portion of a die cut from the wafer is attached to a pivoting member formed in a layer of single-crystal silicon with a hinge formed of the layer of single-crystal silicon. The pivoting member rotates relative to the base portion about an axis essentially perpendicular to the major surface of the die.

A mirror attached to the pivoting member is formed from the layer of single-crystal silicon and has a mirror surface congruent with a major crystalline plane. A high-quality reflective coating of gold or other metal, or a dielectric stack can be deposited on the mirror surface because it is an open surface. A latching spring holds the pivoting member, and hence mirror, in one of two switch positions.

A magnetic drive is actuated with a simple pulse that both accelerates and decelerates the pivoting member as it switches between states. The impedance of the magnetic drive can be measured to determine the position of the switch, or a separate sensing circuit can be integrated onto the MEMS die to determine switch position.

In a particular embodiment, the backside of the mirror is thinned to reduce the mass of the mirror and thus the inertia encountered when switching between states. In a further embodiment, the backside of the mirror is patterned with reinforcing ribs to maintain a rigid mirror while reducing its mass. In another embodiment, both sides of the mirror are reflective. Release of the relatively large mirror structure from the bonding layer is achieved by etching through the substrate to allow etching of the bonding layer.

DETAILED DESCRIPTION OF THE INVENTION

I. Introduction

An optical switch with a relatively large mirror is fabricated using MEMS techniques. The optical switch includes a magnetic motor that raises and lowers the mirror in response to a control signal. The control signal can be a simple pulse of electric current at a relatively low voltage, such as about 5 volts. The optical switch can be switched from either state to the opposite state with the same pulse, and the pulse duration can be chosen to decelerate the mirror assembly after switching to reduce ringing. The mirror can be a single-sided or double-sided mirror, and is typically formed on a major plane of a single-crystal silicon superstrate. Forming the mirror on a major surface of the single-crystal produces a high-quality mirror, which provides low insertion loss when used in a switching application.

A silicon flexure pivot hinge on an end of an arm integrated with the mirror allows the mirror to rotate about an axis perpendicular to the major surface of the MEMS cell or die. The dies or strips of dice can be edge-mounted to a substrate serving as a miniture optical bench. The mirrors are raised and lowered into and out of the path of an optical beam to direct the beam in a selected fashion. The optical beam originates from an optical input fiber with fiber-end optics that convert the light signal carried on the fiber into a beam. Optics on the ends of the output fibers collect the light beam and focus it onto the end of the desired output fiber. This free-space optical beam approach provides low inter-channel "cross-talk".

II. A Magnetic MEMS Optical Switching Cell

Figure 1A:
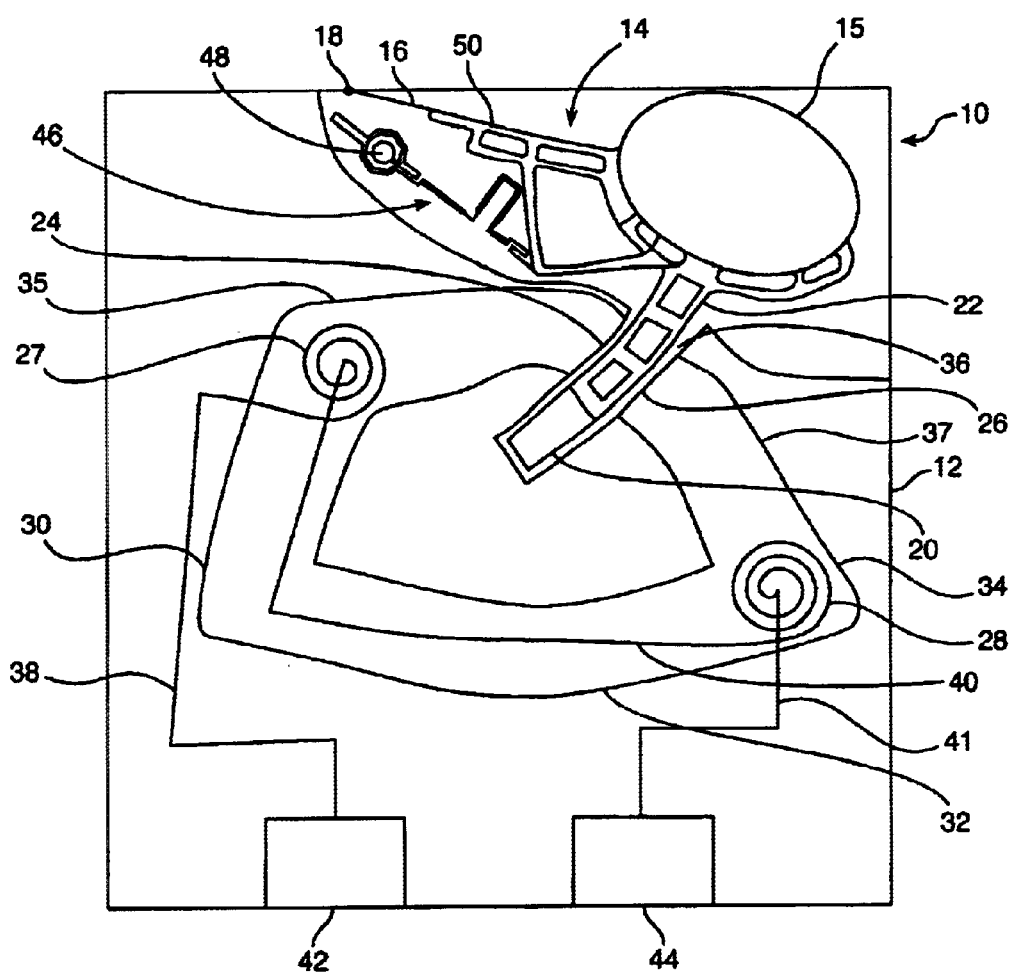
FIG. 1A is a simplified top view of a MEMS cell according to an embodiment of the present invention in a retracted state.

FIG. 1A is a simplified top view of a magnetic MEMS cell 10 in a first (retracted) position. The cell, or die, is about 2.3×3.1 mm. Generally speaking, several cells are fabricated on a silicon-on-insulator (SOI) substrate, and the individual cells are then cut out of the substrate. Features are defined in the overlying thin layer (~10–80 microns) of single-crystal silicon (the "superstrate") by photomasking and etching processes. The underlying oxide material is then removed from beneath at least the movable portions of the device using a selective etch process. In some instances, a strip of cells, i.e. a portion of a row or column of cells on the substrate is cut out. The cell includes a base portion 12 and a pivoting member 14. The base portion is typically bonded to a carrier and the pivoting member moves relative to the base portion.

The pivoting member 14 is attached to the base portion 12 with a hinge 16 and essentially rotates about a hinge attachment post 18. The actual center of rotation of the pivoting member varies with the amount of rotation relative to the base. The true rotational center generally describes an arc as the pivoting member pivots, due to the offset between the hinge attachment post 18 and the spring anchor point 48. Thus the motion of the movable element is approximately circular. The hinge is a narrow isthmus of single-crystal silicon that allows at least about thirty degrees of rotation. The hinge is a flexure pivot that provides stability to the pivoting member to maintain planarity with the base during rotation while avoiding "stiction" (sticking friction) that often plagues bearing structures included in MEMS devices. The hinge is also relatively stiff to tensile and compressive loads on the pivoting member. An attachment post (see FIG. 1C, ref. num. 52) underlying the hinge attachment post connects the pivoting member to the base portion.

Figure 1B:
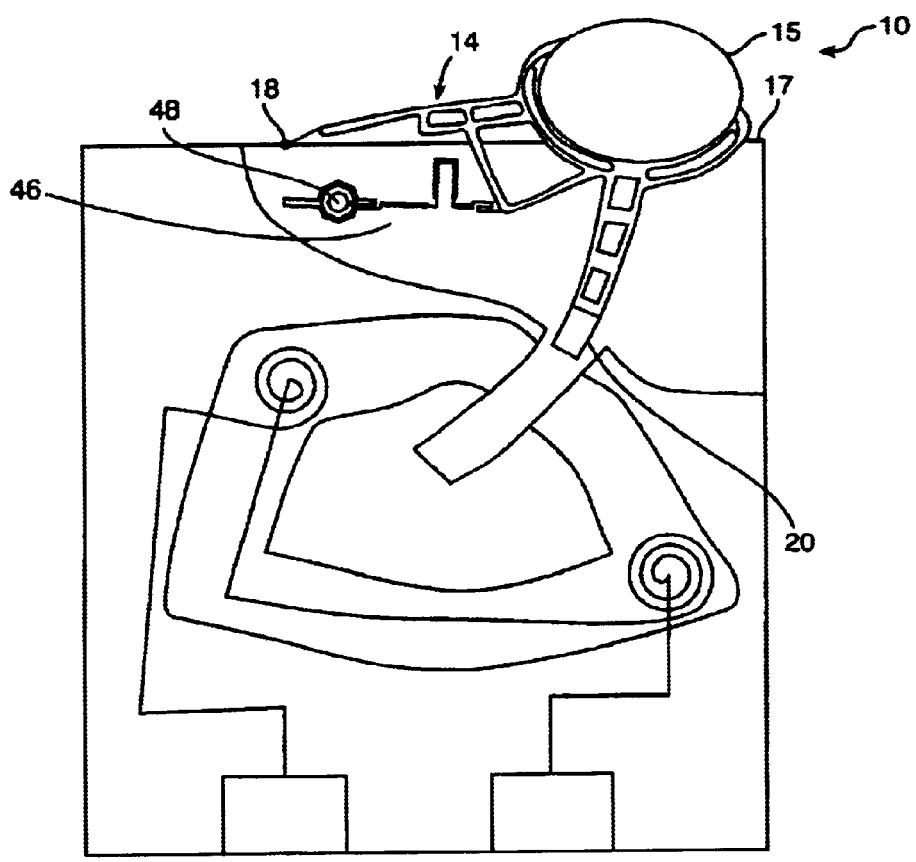
FIG. 1B is a simplified top view of the MEMS cell illustrated in FIG. 1A in an extended state.

The pivoting member 14 includes a magnetic tab 20 formed on an arm 22. The arm moves between two poles 24, 26 when the die is toggled (compare to FIG. 1B) to raise and lower a mirror 15 or other optical element. Current-carrying coils 27, 28 activate the magnetic circuit, which is completed by the magnetic bridges 30, 32, 34 to pull the magnetic tab 20 into the gap 36 between the poles to provide a lower energy path for the flux between the cores 35, 37. However, the magnetic tab continues through the gap until the pivoting member achieves a stable position, i.e. latches. In this example, the pivoting member has two stable positions, which will be referred to as "retracted" (FIG. 1A) and "extended" (FIG. 1B).

Electric current is provided to the coils 27, 28 through metal traces 38, 40, 41 connecting the coils to edge connectors or bonding pads 42, 44. The traces and connectors/pads can be made of any of several suitable conductive materials, such as plated copper. The edge connectors are desirable when edge mounting several dice on a printed wiring substrate. Solder, eutectic, conductive epoxy, or similar material can then be used to connect the edge connectors to the patterned traces on the printed wiring substrate.

A variety of conductive windings are available that could induce the magnetic flux in the cores. "Pancake" style windings are illustrated in FIGS. 1A and 1B, which are commonly used in the recording head industry. Other windings could be used, including toroidal windings made using thin-film techniques, solenoid windings, and windings of insulated wire made by hand or machine.

One advantage of using the magnetic motor, compared to an electro-static comb drive, for example, is that the magnetic motor is a current-based device that can operate at a significantly lower voltage. While typical operating voltages for electrostatic comb drives might be in the range of 20–40 V, magnetic motors according to the present invention can operate with a drive signal with a maximum voltage less than 10 V, and in some embodiments, about 5 V, and in yet other embodiments less than 5 V. This provides several practical advantages. First, many drive or control circuits use power in the 5–10 V range, thus these supplies can be used directly or stepped down with a simple voltage regulator. In contrast, higher voltages are typically generated with voltage boost circuits, which can consume significant wafer area, might fail, and might present a shock hazard. Additionally, fabricating these voltage boost circuits might require modifications to the semiconductor fabrication process to provide dielectric layers suitable for operation at the higher voltages.

A number of additional coils, similar to or different from each other, can be included to increase the number of current loops driving flux through the core. The coils are connected in series, that is the current flows from one bonding pad, through a first coil, through the second coil, and back to the other bonding pad. A variety of other circuits could be used, such as a parallel circuit, or the base portion (substrate) can provide a ground connection to sink or source current.

The magnetic tab 20 can be made of ferromagnetic material or permanent magnetic material. In a preferred embodiment, a ferromagnetic nickel-iron alloy with 45% nickel and 55% iron is chosen. This alloy is commonly known as PERMALLOY. The patterned core(s) and magnetic bridges are also formed from this alloy; however, the cores do not have to be of the same material as the magnetic tab, and other materials for either could be chosen, including other nickel-iron alloys. Thin layers of dielectric material generally separate the energizing coils, traces, and metal magnetic structures from each other, with vias through the dielectric layers providing a conductive connection where desired.

Flux is induced in the core by energizing the coils 27, 28. The flux circulates through the core, to the poles and across the gap. The interaction of the gap field with the magnetic tab attracts the magnetic tab toward the gap, thus producing a torque on the pivoting member. The torque draws the magnetic tab toward the centered position between the poles. The inertia of the rotating mass of the pivoting member 14 carries it through the centered position toward another stable position derived from a latching spring system. Other equivalent actuators, such as other magnetic actuators or electrostatic actuators, may become apparent to those skilled in the art. In particular, the hinged design allows adaptation of various actuators by positioning the actuators on the pivoting member to take advantage of various lever arrangements.

A spring structure 46, which in this instance extends generally from a spring anchor point 48, also connects the pivoting member 14 to the base portion 12 through an attachment post (not shown) underlying the spring anchor point. The pivoting member is rigid to radial compression by attachment to the hinge attachment post 18 through the rigid load beam 50. The hinge 16 connects the load beam to the hinge attachment post. The hinge 15, rigid load beam 50, spring structure 46, and other elements of the pivoting member 14 are monolithic, that is they are all formed from the single-crystal silicon superstrate by selective removal of the surrounding material.

A spring structure 46, which in this instance extends generally from a spring anchor point 48, also connects the pivoting member 14 to the base portion 12 through an attachment post (not shown) underlying the spring anchor point. The pivoting member is rigid to radial compression through the rigid load beam 50. The hinge 16 connects the load beam to the hinge attachment post 18. The hinge 15, rigid load beam 50, spring structure 46, and other elements of the pivoting member 14 are monolithic, that is they are all formed from the single-crystal silicon superstrate by selective removal of the surrounding material.

FIG. 1B is a simplified top view of the MEMS cell 10 illustrated in FIG. 1A in the extended, rather than retracted, position. The spring structure 46 is an essentially radial spring that latches the pivoting member in either the retracted or extended position. The pivoting member is driven between the positions, as described above, by the interaction of the gap field with the magnetic tab 20 Various spring latching systems can be fabricated to achieve numerous stable states. In this instance, the latching system is formed by having two different attachment points for the pivoting member, namely the hinge attachment post 18 and the spring attachment post 48. All of the mirror 15 extends beyond the upper edge 17 of the die, but such extension is not essential. In a preferred embodiment the mirror extends at least 400 microns above the edge of the die to facilitate switching of free-space optical beams.

III. Fabrication of Large Superstrate Elements and Mirror

In conventional MEMS fabrication processes, clearing the oxide bonding layer from between the superstrate and the substrate to free movable portions of the device is often done by insuring that the width (looking down from above the device) of any portion of the movable element is sufficiently thin so that undercutting by the etchant from both sides is sufficient to completely remove the oxide. In other words, the undercutting will coalesce to free the movable element. Hence, many conventional MEMS devices limit the design of the movable elements to narrow portions. In some instances, the thickness of the superstrate is used to fabricate larger structures, such as mirrors, but this presents additional challenges in forming a flat, smooth surface and deposition of the reflective layer(s) on a vertical surface (i.e. perpendicular to the major surface) of the device. Another approach has been to perforate the superstrate to provided additional access of the etchant to the underlying bonding layer. However, such perforations might be undesirable in some structures. Thus, it is desirable to form large movable structures in the superstrate without perforating those structures.

In the MEMS cell illustrated in FIG. 1A there are four large structures formed monolithically in the superstrate: The hinge anchor post, the spring anchor post, the magnetic tab, and the mirror. The hinge anchor post and the spring anchor post take advantage of the large size of these structures to connect the substrate to the pivoting member. The magnetic tab and mirror are freed from the substrate by one of two ways.

Figure 1C:
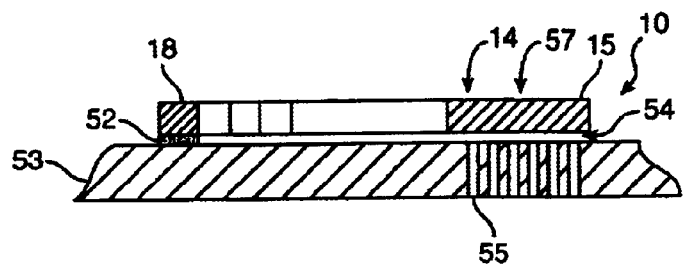
FIG. 1C is a simplified cross section of a portion of a MEMS cell according to an embodiment of the present invention.

FIG. 1C is a simplified cross section of the MEMS cell illustrated in FIGS. 1A and 1B, above, through a plane intersecting the hinge attachment post 18 and mirror 15. The hinge attachment post is attached to the substrate 53, which is typically about 500 microns thick, through the attachment post 52, which is formed of material originally between the superstrate and the substrate 53. The substrate is also silicon and the intervening material is silicon dioxide, typically about 2 microns thick, although other substrates and bonding interface materials can be used. This material has been removed from beneath the pivoting member 14, leaving a void 54, thus allowing the pivoting member to rotate in relation to the substrate. The pivoting member is otherwise aloft of the substrate and free to move.

Selective etchant (e.g. HF acid or buffered HF acid solution) is provided to the backside of the mirror 15 via perforations 55 through the substrate 53. Similar perforations are provided beneath the magnetic tab area. These perforations are formed sing backside photolithography and silicon etch steps. A selective etch that preferentially removes silicon can be used, including a directed plasma (anisotropic) etch. After the backside silicon etch and the topside silicon etch (to define the structures in the superstrate), an isotropic etch using an HF solution removes the intermediate silicon dioxide to free the pivoting member from the substrate. Thus, the large structures in the pivoting member can be formed without topside perforations.

A high-quality mirror surface can then be achieved with a chemical polishing step that removes a slight amount of material from the major surface 57 of the die/mirror. Other steps, such as thermal oxide formation and stripping, can also be used to smooth the surface of the mirror. The major surface presents a major crystal plane, such as a 111, 100 or 110 plane, and is the 100 plane in a particular embodiment, allowing a nearly atomically flat mirror surface to be formed. Similarly, the major surface of the mirror is available for depositing a high-quality reflective coating, such as a uniform thin layer of gold or aluminum. Furthermore, other types of reflectors, such as dielectric thin-film stack reflectors, including frequency-selective reflectors (thin-film optical filters), can be deposited on the major surface of the mirror.

Figure 1D:
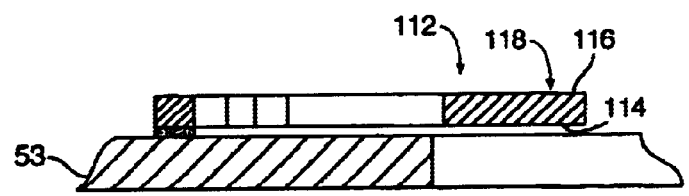
FIG. 1D is a simplified cross section of a portion of a MEMS cell with a two-sided mirror according to another embodiment of the present invention.

FIG. 1D is a simplified cross section of a portion of a MEMS cell 112 according to another embodiment of the present invention. The portion of the substrate 53 underlying the mirror field 116 has been removed to expose the backside 114 of the mirror structure. Thus this mirror can be a two-sided mirror. In other words, a first mirror coating(s) can be applied to the frontside 118 the mirror and a second mirror coating(s) can be applied to the backside 114 of the mirror. Alternatively, only a single side (either front or back) is mirrored. The mirror can be raised for backside coating by using a micro-manipulator to push the mirror into the latched raised position that exposes the backside of the mirror, rather than removing the substrate underlying the mirror. In another embodiment the mirror is fabricated in the raised position with the substrate underlying the mirror removed for backside coating.

Figure 1E:
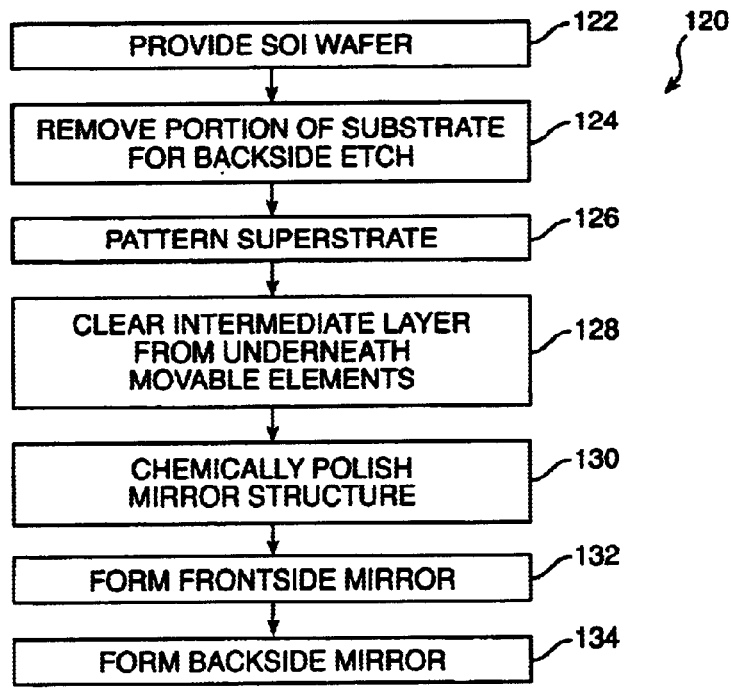
FIG. 1E is a simplified flow chart of a process for fabricating a MEMS cell according to an embodiment of the present invention.

FIG. 1E is a simplified flow chart of a method 120 for fabricating a MEMS device according to an embodiment of the present invention. A wafer having a substrate, an intermediate layer, and a superstrate is provided (step 122). A selected portion of the substrate is removed (step 124) to provide an etchant path to the intermediate layer. In one embodiment the selected portion of the substrate that is removed is a plurality of vias or perforations through the substrate to the intermediate layer. In another embodiment the selected portion of the substrate that is removed is a contiguous field of the substrate. A selected pattern is formed on the superstrate (step 126), the selected pattern including a large movable feature overlying the removed portion of the substrate. The intermediate layer is then etched away from beneath the large movable feature and other movable elements of the selected pattern formed in the superstrate (step 128).

In a further embodiment, the large movable feature is a mirror structure. The mirror structure is chemically polished (step 130) on a major crystalline plane, and a mirror coating is formed on the mirror surface (step 132). In yet a further embodiment, the selected portion of the substrate is a contiguous field underlying the mirror and a second mirror coating is formed on the backside of the mirror structure (step 134). In an alternative embodiment, the surface(s) of the mirror structure are sufficiently flat and smooth to omit the chemical polishing step.

IV. Switch Operation

The MEMS cells illustrated above in FIGS. 1A and 1C can operate from a single-sided pulse. That is, current through the coils will create a magnetic flux across the drive poles that will attract the magnetic tab from either the extended or the retracted position. Switching between positions, in either direction, will be referred to as "toggling". Furthermore, current flowing in either direction will attract the tab toward the poles. This simplifies operation of the cell compared to other MEMS devices that require bipolar drive signals. Similarly, because the actuator is based on magnetic attraction, rather than electrostatic, it is a current, rather than a voltage, device. This allows the use of lower voltage drive signals, particularly the use of voltage less than 40 V, typically about 5–10 V, and in some cases less than 5 V. Voltages above 40 V present a shock hazard to the operator and are more difficult to generate in a voltage boost pump circuit, typically requiring additional voltage pump stages as the voltage increases, reducing conversion efficiency.

Optical switches according to the present invention achieve switching from one state to another in less than 50 mS, which is desirable for SONET-type applications. In a particular embodiment, a switch changes states in less than 5 mS, and in yet a further embodiment, a switch changes states in about 1 mS or less with a maximum applied voltage of about 5 V or less.

Figure 1F:
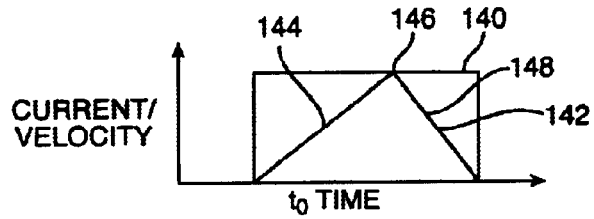
FIG. 1F is a simplified graph of current and velocity versus time illustrating braking during switching of a MEMS cell according to an embodiment of the present invention.

FIG. 1F is a simplified graph of current 140 supplied to the coils and velocity 142 of the pivoting member as a function of time. When the current starts at to the pivoting member starts to accelerate 144 and continues accelerating as the magnetic tab passes through the drive poles 146. The momentum of the pivoting member and spring force, if any, carries the magnetic tab past the poles. However, the current pulse is maintained and the pivoting member starts to decelerate 148 because the poles continue to attract the magnetic tab. Hence, a single, uni-polar pulse not only toggles the device, but also brakes (decelerates) the device, thus reducing bounce and settling time. The graph is idealized for simplicity of illustration, and the velocity might not be symmetrical about the center point, or reach zero when the pulse stops.

Figure 1G:
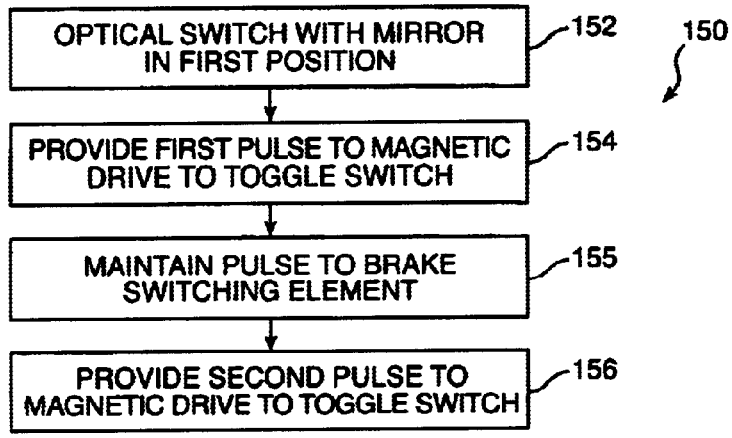
FIG. 1G is a simplified flow chart of a method of operating a MEMS cell according to an embodiment of the present invention.

FIG. 1G is a simplified flow chart of a method for operating a MEMS optical switch 150 according to an embodiment of the present invention. Optical switching can be achieved by rotating the mirror about the hinge attachment post to extend and retract the mirror, for example. Other optical elements, such as filters, diffraction gratings, or lenses could be used. A MEMS optical switch with a magnetic drive actuator is provided in a first position (i.e. extended or retracted) (step 152). A first pulse is provided to the magnetic drive actuator (step 154) to toggle the optical switch by rotating a hinged optical element in the major plane of the optical switch in a first direction (e.g. clockwise) about an axis (hinge attachment post) essentially perpendicular to the major plane of the optical switch. A second pulse is provided to the magnetic drive actuator (step 156) to toggle the optical switch by rotating the optical element in a second direction (e.g. counter clock-wise) about the axis. In one embodiment the pulses are uni-polar. In a further embodiment the first pulse is maintained (step 155) to brake the motion of the optical switch.

V. Latching Spring Mechanism

Figure 2A:
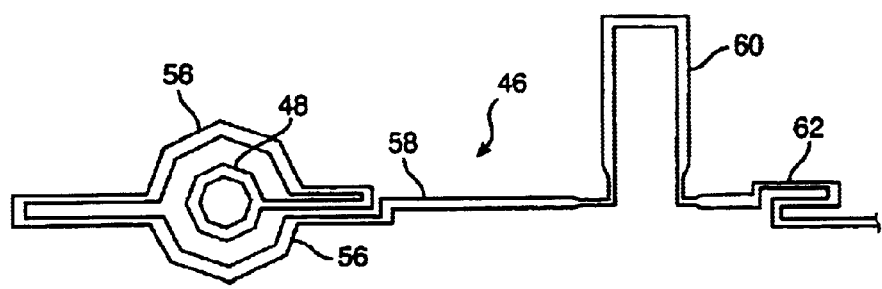
FIG. 2A is a simplified top view showing details of the spring structure illustrated in FIG. 1A.

FIG. 2A is a simplified top view of a spring structure 46 used in a latching MEMS cell according to FIGS. 1A and 1B, above. The spring structure joins the pivoting member (not shown in this view) to the substrate through the spring anchor point 48. The spring anchor point is not co-located with the hinge anchor point (see FIG. 1A, ref. num. 18), and provides a different radius of curvature. The spring structure includes a "clam-shell" pivot 56, a stiff load beam 58, a "C"-spring 60, and a serpentine spring 62.

The spring is anchored to the substrate through the clam-shell pivot 56. This pivot allows angular motion about the spring anchor point 48, but avoids a continuously rotating bearing, which is far more complex to fabricate and is subject to stiction and wear. The restoring force of the clam-shell pivot is small, such that through the arc of travel between the extended and retracted positions, the restoring force is dominated by the radial C-spring 60 rather than the clam-shell pivot.

The beams of the clam-shell pivot 56 are arranged so that they wrap around the spring anchor point 48. As the pivoting member is rotated, the beams forming the clam-shell pivot above the spring anchor point bend in the opposite direction as the beams below the anchor point. It is understood that "above" and "below" relate to the beams as illustrated in FIG. 2A, and that they are fabricated in the same plane of the device and may not be above or below each other in operation. This creates a circular rotation about the anchor point. Spring structure 46 is very stiff to radial loads, due to the number of beams, their relatively small length, and the fact that the rotation of the mechanism is such that the majority of radial load on the hinge is in the direction to apply compressive or tensile load.

The stiff load beam 58 links the clam-shell pivot 56 to the C-spring portion 60 of the spring structure. The stiff load beam is designed to stiffen the spring structure in the radial direction. Radial compression of the spring structure takes place predominantly in the C-spring portion, which is designed to be stiff in bending but compliant in radial compression.

The serpentine spring 62 is the final component of the spring structure. The serpentine spring connects the C-spring 60 to the pivoting member (not shown in this view) at the end of the spring structure opposite the spring anchor point. When the pivoting member rotates, the serpentine spring has a torque applied to it by the changing of relative angles between the pivoting member and the spring structure. This torque can be significant and can cause the spring structure to rotate in a non-circular fashion. The serpentine spring 62 reduces the rotational stiffness by distributing the stress over an effectively longer beam length, and yet maintains a very high radial stiffness, which is desirable. Compared to a simple flexing beam hinge, the serpentine spring reduces the rotational stiffness of the entire system.

Figure 2B:
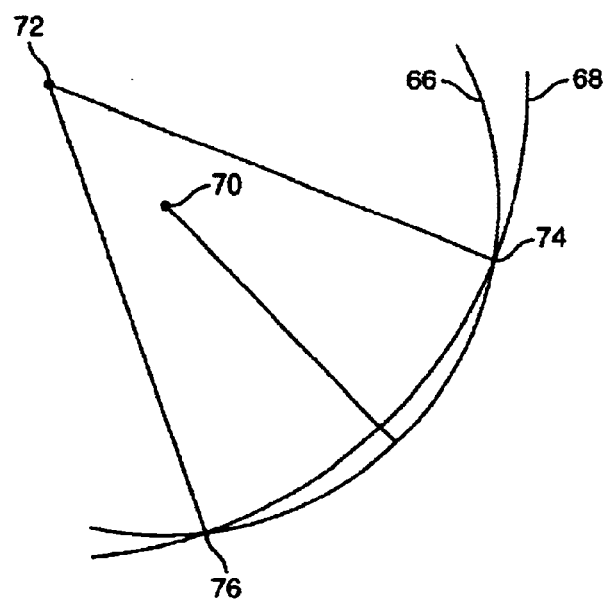
FIG. 2B is a simplified chart illustrating the motion of the spring structure and pivoting member about two non-co-located centers.

FIG. 2B is a simplified plot of the motion of the spring structure about the spring anchor point and the pivoting member about the hinge attachment post if the two structures were not joined together. Their independent motions could be characterized by two arcs of rotation 66, 68 with different radii of curvature about two different centers of rotation 70, 72. As can be seen from the diagram, the arcs of rotation have two intersection points 74, 76. These are the two stable positions in which the pivoting member can stably reside with no driving force from the magnetic core. In other words, the pivoting member, when joined to the spring structure, will remain in one position or the other with no electrical energy supplied to the MEMS cell. It is noted that the true stability points are a result of balanced forces on all the movable members in the system, and that depending on the details of the design, the stability points will not be exactly coincident with the intersection of the two arcs shown. Nevertheless, this approximation is useful in describing and understanding the function of the device.

The upper intersection 74 represents the as-manufactured (extended) state, in which the spring structure has no compression, tension, or strain from rotation. As the pivoting member rotates with respect to the substrate, the angular trajectory about the hinge attachment post is accommodated by the compliant C-spring portion of the spring structure. The C-spring is a rectangular kink in the structure connecting the pivoting member to the spring attachment post. This kink can compress and verify in response to the arc of travel of the pivoting member.

As the pivoting member begins to move from the as-manufactured extended position, the spring structure will rotate and compress at the C-spring. The restoring force of the C-spring creates an energy barrier between the two stable positions. As the pivoting member rotates further, the C-spring goes through a compression maximum and then at least partially decompresses. The dimensions of the C-spring determine the stiffness and therefore the energy barrier between the stable positions. The amount of compressive force can be manipulated by design, for example by moving the position of spring attachment post, or by changing the aspect ratio or thicknesses of the C-spring elements. It will be clear to one skilled in the art that many variations of this embodiment can be envisioned without departing from the spirit and scope of this invention, depending on the throw, torques, voltages and other design aspects of a particular application.

Figure 2C:
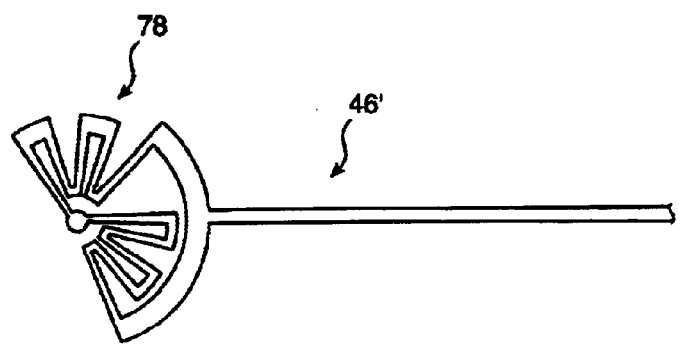
FIG. 2C is a simplified top view of a spring pivot according to another embodiment of the present invention.

The pivot/spring system forms the "latch", which latches the utilitarian feature in either of the two stable positions, either extended or retracted. Upon cessation of the driving current, the pivoting member will remain in the chosen stable position. FIG. 2C is a simplified top view of a spring structure 46' according to another embodiment of the present invention. An accordion-shaped pivot 78 replaces the clam-shell pivot shown in FIG. 2A. The accordion-shaped pivot provides high angular compliance and high radial stiffness, but is more complex in design than the clam-shell pivot. Additional embodiments for pivots with high radial stiffness will be clear to those skilled in the art, based on this concept of a monolithic bearing which allows essentially free rotation through an arc of travel at least about 30 degrees, but substantially less than 360 degrees.

VI. Position Sensing

Figure 3A:
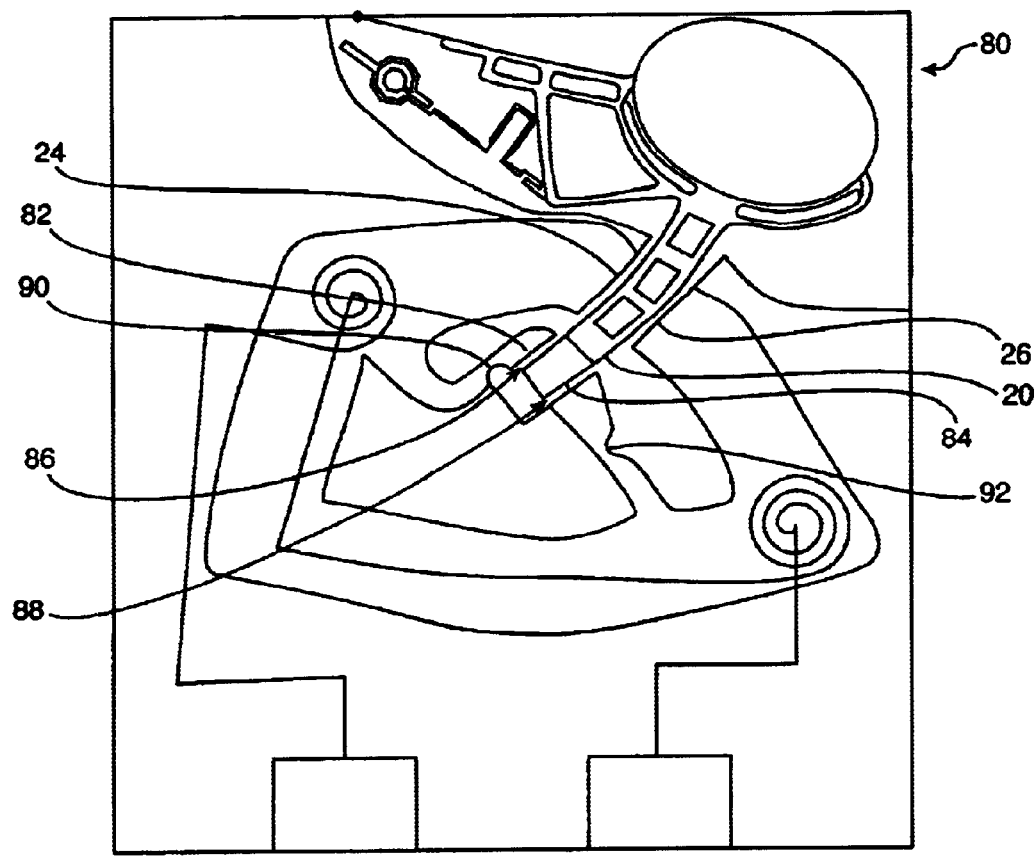
FIG. 3A is a simplified top view of a MEMS cell with sensing poles according to another embodiment of the present invention.

FIG. 3A is a simplified top view of a MEMS cell 80 according to a further embodiment of the present invention. Sensing poles 82, 84 are patterned in the superstrate and deposited with iron-nickel alloy similarly to the drive poles 24, 26 for convenience. However, the sensor poles may be of a different material in order to optimize separately the magnetic properties and performance of the actuator magnetic circuit and the sensing magnetic circuit.

Whether the magnetic tab 20 is between the sensing poles 82, 84 can be determined by measuring the inductance of the magnetic circuit formed by the drive coils 24, 26, bridges 30, 32, 34, cores 35, 37, sensing poles 82, 84, and magnetic tab 20. Hence, the position of the pivoting element can be determined. In an alternative embodiment, the sensing poles are omitted and there is a sufficient difference in inductance between the retracted position and the extended position to sense the position of the pivoting member. However, a more precise measurement can be made by providing the magnetic sensing circuit illustrated. In an alternative embodiment, the magnetic sensing circuit is used to provide a feedback signal to selectively position the pivoting member throughout a range of rotation using a permanently magnetized material on the magnetic tab and an opposing spring.

When current is applied to the coils 26, 28 a magnetic flux path is established between the sensor pole 82 across a narrow gap 86 to the magnetic tab 20, across the adjacent narrow gap 88 between the tab and to the adjacent sensor pole 84. Each sensing pole is shaped with a narrowed portion 90, 92 designated the "pinch" region. The function of the pinch region is to limit the magnetic flux flowing through the sensor poles. When the cell is toggled from one position to another, the pinch regions become magnetically saturated and the reluctance of the magnetic circuit rises. Saturation of the sensor pole structure assures that most of the flux is carried by the major actuator poles, in order to maximize the torque of the actuator during operation. The sensor poles also exert a force on the rotating member when the switching circuit is energized, and this additional force can be used to offset or fine-tune the behavior of the overall actuator. Tuning of this force can be accomplished by adjusting the width of the pinch region.

For the preferred embodiment, the width of the pinch region is on the order of 10%–30% of the width of the sensor poles 82. 84. In general, the width of the pinch will depend on the accuracy needed for the measurement. A narrower pinch provides a more sensitive measurement, but with a smaller dynamic range.

Figure 3B:
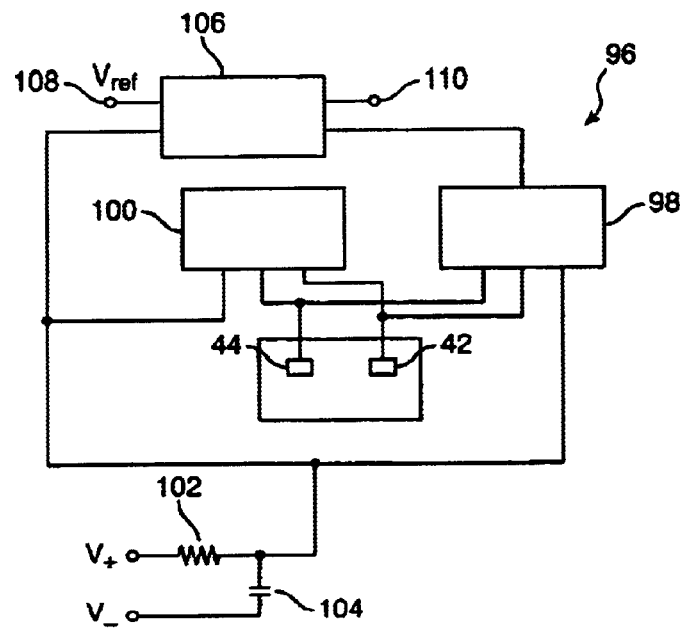
FIG. 3B is a simplified diagram of an actuating and measurement system according to an embodiment of the present invention.

FIG. 3B is a simplified diagram of a circuit 96 for toggling the MEMS switch between states and for measuring the inductance of the sensing circuit, hence determining the position of the MEMS switch. An inductance comparator 98 connected to the coils of the MEMS cell through the bonding pads 42, 44 performs the measurement by applying a small oscillatory signal from the frequency generator 100 to the magnetic sensing circuit, and measures the difference in the inductance with the rotating member in the retracted versus the extended position. The measurement frequency is chosen to maximize the distinction between the two positions. A high frequency, typically several MHz, measurement minimizes the contribution of the major actuator poles to the inductance reading by tuning out this larger structure.

Power is supplied through a resistor 102 and capacitor 104 to the coils of the device, as well as to the electronic functional blocks the switch comparator 106 inductance comparator 98 and frequency generator 100. Also supplied to the comparator is a reference signal 108 representing the desired state of the rotating member (retracted or extended). The comparator 106 provides an output 110, typically a high or low voltage, indicating the state of the switch. The output signal is generated by comparing the measured inductance of the magnetic sensing circuit to the reference. This reveals the state of the device as being either in the retracted position or the extended position.

The inductance comparator monitors the inductance in the magnetic sensing circuit. A large inductance value is measured when the pivoting member and magnetic tab are in the retracted position (see FIG. 1A). However when the rotating member is in the extended position (see FIG. 1B), the magnetic tab is absent from the gap, creating a larger magnetic reluctance in the magnetic circuit, and a correspondingly low inductance as measured by the inductance comparator.

Figure 3C:
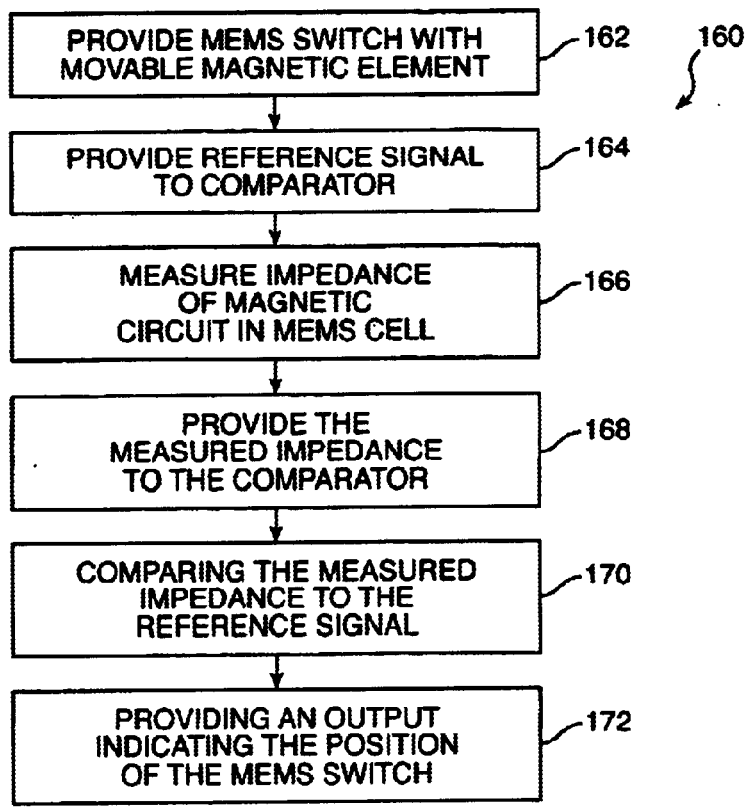
FIG. 3C is a simplified flow diagram of a process of sensing the position of the movable element of a MEMS cell according to another embodiment of the present invention.

FIG. 3C is a simplified flow chart of a method 160 for sensing the position of a MEMS switch according to an embodiment of the present invention. A MEMS switch is provided with a magnetic circuit and a movable magnetic element (step 162) capable of being switched from a first position to a second position and disposed to alter the impedance of the magnetic circuit according to the position of the movable magnetic element. Providing a reference signal to a comparator (step 164), measuring the impedance of the magnetic circuit (step 166) and providing the measured impedance to the comparator (step 168). Comparing the measured impedance with the reference signal (step 170) and providing an output (step 172) indicating the position of the movable magnetic element, and hence the switch position or state. As discussed above, the impedance measurement can be an inductance. In a further embodiment, the magnetic circuit includes a first actuator pole, a second actuator pole, a first sensor pole, and a second sensor pole. In a yet further embodiment, a first pinch region is disposed between the first sensor pole and the first actuator pole, and a second pinch region is disposed between the second sensor pole and the second actuator pole.

VII. Fabrication of a Low-Inertia Mirror

When MEMS cells are used in an optical switching application, fast switching speeds are generally preferable to slow switching speeds. Similarly, it is generally more desirable to switch states with less power, rather than with more. These objectives can be met by lowering the inertia (mass and/or lever arm) of the pivoting member. One way to lower the mass is to make a smaller movable structure. For example, if the mirror is an oval with axis of 1,100×1,560 microns, reducing the oval to 550×780 microns is one way to reduce the mass. However, it may be desirable to maintain the larger mirror size to aid alignment of the MEMS cell to other optical elements or to reduce the insertion loss of an optical signal reflecting off the mirror.

Alternatively, the mirror could be thinned, for example from about 40 microns to about 20 microns. Thinning would reduce the mass of either mirror; however, excessive thinning of the larger mirror reduces mirror stiffness, which can allow distortion of the mirror to occur, resulting from residual stresses from the manufacturing process or stresses arising from changes in the ambient temperature, or even shock and vibration.

Figure 4A:
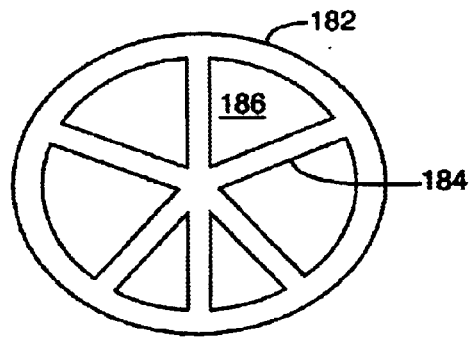
FIG. 4A is a simplified bottom view of a lightened and reinforced mirror according to an embodiment of the present invention.

FIG. 4A is a simplified bottom view of a reinforced mirror structure 180 according to an embodiment of the present invention. Ribs 182, 184 stiffen the thinner mirror segments 186. A radial spoke pattern of ribs with a circumferential rib is illustrated, but several other patterns are possible. In a particular embodiment, the ribs are about 40 microns thick (essentially the initial thickness of the superstrate), and the thinned segments are about 20 microns thick, although the second number may be selected according to many variables, as those skilled in the art will understand. Finite element analysis can be used to model the mirror structure to arrive at suitable configurations and thickness.

Figure 4B:
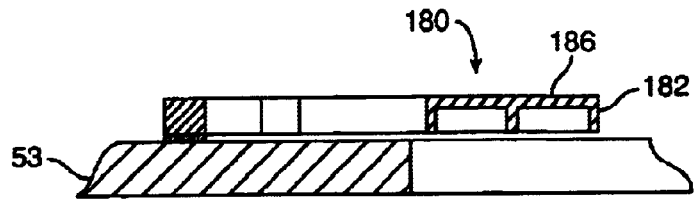
FIG. 4B is a simplified cross section of a MEMS cell with a lightened and reinforced mirror according to another embodiment of the present invention.

FIG. 4B is a simplified cross section of the reinforced mirror structure 180 illustrated in FIG. 4A. A contiguous field of the substrate 53 has been removed from beneath the mirror structure to provide access to the backside of the mirror. The circumferential rib 182 and other ribs have been formed by lithographic processes. The dimensions of the features are relatively large, so a non-contact exposure method of resist is acceptable. For example, the pattern can be directly written on backside resist with an electronic beam or a focused optical exposure method can be used with photoresist.

Alternatively, the backside reinforcing pattern can be achieved by removing the substrate in the pattern of the thinned sections, washing out the oxide layer overlying the sections to be thinned, and then thinning the selected regions of the superstrate. The ribs may be thin enough to allow undercutting to free the mirror structure, or perforations in the underlying substrate beneath the ribs in accordance with the procedures described in association with FIG. 1D may be provided with intermediate masking steps.

While the preferred embodiments of the present invention have been illustrated in detail, it should be apparent that modifications, adaptations, and equivalents to the described embodiments might occur to one skilled in the art. For example, a prism or optic wedge might be used to direct optical beams in a switching operation without departing from the scope of the present invention as set forth in the following claims.

What is claimed is:

1. A micro-electro-mechanical system ("MEMS") optical switch comprising:
   a base portion of a die attached to
   a pivoting member with
   a hinge, the pivoting member rotating in relation to the base portion about an axis essentially perpendicular to a major surface of the die;
   a mirror having a mirror surface essentially parallel to the major surface of the die, the mirror being integrated with the pivoting member; and
   an actuator disposed to rotate the pivoting member to move the mirror from a first switch position to a second switch position.

2. A micro-electro-mechanical system ("MEMS") optical switch comprising:
   a base portion of a die attached to
   a pivoting member with
   a hinge, the pivoting member rotating in relation to the base portion about an axis essentially perpendicular to a major surface of the die;
   a mirror having a mirror surface essentially parallel to the major surface of the die, the mirror being integrated with the pivoting member;
   an actuator disposed to rotate the pivoting member to move the mirror from a first switch position to a second switch position; and
   a latching spring connected to the base portion and to the pivoting member.

3. The optical switch of claim 2 wherein the latching spring is a radial spring having a first arc of motion and the pivoting member has a second arc of motion, a the first switch position corresponding to a first intersection of the first arc of motion and the second arc of motion and the second switch position corresponding to a second intersection of the first arc of motion and the second arc of motion.

4. The optical switch of claim 3 wherein the binge is connected to the base portion with a hinge post and the axis is offset from the hinge post.

5. A micro-electro-mechanical system ("MEMS") optical switch comprising:
   a base portion of a die attached to
   a pivoting member with
   a hinge, the pivoting member rotating in relation to the base portion about an axis essentially perpendicular to a major surface of the die;
   a mirror having a mirror surface essentially narallel to the major surface of the die, the mirror being integrated with the pivoting member; and
   an actuator disposed to rotate the pivoting member to move the minor from a first switch position to a second switch position, wherein at least a portion of the mirror in the first switch position extends beyond an edge of the die.

6. The optical switch of claim 5 wherein the portion of the mirror extending beyond the edge of the die extends at least about 400 microns.

7. The optical switch of claim 1 wherein the actuator is a magnetic drive.

8. A micro-electro-mechanical system ("MEMS") optical switch comnrising:
   a base portion of a die attached to
   a pivoting member with
   a hinge, the pivoting member rotating in relation to the base portion about an axis essentially perpendicular to a major surface of the die;
   a mirror having a mirror surface essentially parallel to the major surface of the die, the mirror being integrated with the pivoting member; and
   a magnetic drive disposed to rotate the pivoting member to move the mirror from a first wherein the magnetic drive comprises
   a first pole disposed on the base portion;
   a second pole disposed on the base portion; and
   a magnetic tab disposed on the pivoting member and movable within a gap formed between the first pole and the second pole.

9. The optical switch of claim 8 wherein the first pole, the second pole, and the magnetic tab comprise an alloy consisting essentially of 45% nickel and 55% iron.

10. The optical switch of claim 8 further comprising
    a first sensing pole disposed on the base portion and
    a second sensing pole disposed on the base portion.

11. The optical switch of claim 10 further comprising
    a first core segment disposed on the base portion;
    a first pinched region disposed between and magnetically coupling the first core segment and the first sensing pole;
    a second core segment disposed on the base portion; and
    a second pinched region disposed between and magnetically coupling the first core segment and the first sensing pole.

12. The optical switch of claim 1 wherein the hinge and the mirror arc formed from single-crystal silicon.

13. The optical switch of claim 12 wherein the hinge and the mirror are formed in a layer of single-crystal silicon about 10–80 microns thick.

14. The optical switch of claim 12 wherein the mirror comprises a metallic film formed on the layer of single-crystal silicon.

15. The optical switch of claim 12 wherein the mirror comprises a thin section and a rib section, the rib section being thicker than the thin section.

16. The optical switch of claim 15 wherein the rib section has a first thickness and the thin section has a second thickness, the first thickness being about twice the second thickness.

17. The optical switch of claim 16 wherein the first thickness is about 40 microns and the second thickness is about 20 microns.

18. A micro-electro-mechanical system ("MEMS") optical switch comprising:

a base portion of a die attached to a pivoting member with a hinge from single-crystal silicon, the pivoting member rotating in relation to the base portion about an axis essentially perpendicular to a major surface of the die;

a mirror integrated with the pivoting member and formed from single-crystal silicon having a mirror surface essentially parallel to the major surface of the die and a plurality of ribs disposed on a backside of the mirror, the mirror comprising a rib section having a first thickness and a thin section having a second thickness, the first thickness being about twice the second thickness; and an actuator disposed to rotate the pivoting member to move the mirror from a first switch position to a second switch position.

19. A micro-electro-mechanical system ("MEMS") optical switch comprising:

a base portion of a die attached to a pivoting member with a hinge, the pivoting member rotating in relation to the base portion about an axis essentially perpendicular to a major surface of the die;

a mirror having a first mirrored surface and a second mirrored surface essentially parallel to the major surface of the die, the mirror being integrated with the pivoting member; and an actuator disposed to rotate the pivoting member to move the mirror from a first switch position to a second switch position.

20. A micro-electro-mechanical system ("MEMS") optical switch comprising:

a base portion of a die attached to a pivoting member with a hinge, the pivoting member rotating in relation to the base portion about an axis essentially perpendicular to a major surface of the die;

a mirror having a mirror surface essentially parallel to the major surface of the die defining an oval of about 1.4×1.0 mm, the mirror being integrated with the pivoting member; and an actuator disposed to rotate the pivoting member to move the mirror from a first switch position to a second switch position.

21. A micro-electro-mechanical system ("MEMS") optical switch comprising:

a base portion of a diet attached to a pivoting member with a hinge, the pivoting member rotating in relation to the base portion about an axis essentially perpendicular to a major surface of the die;

a mirror having a mirror surface essentially parallel to the major surface of the die defining an oval of about 780×550 microns, the mirror being integrated with the pivoting member; and an actuator disposed to rotate the pivoting member to move the mirror from a first switch position to a second switch position.

22. A micro-electro-mechanical system ("MEMS") optical switch comprising:

a base portion of a die attached to a pivoting member formed in a layer of single-crystal silicon with a hinge formed of the layer of single-crystal silicon, the pivoting member rotating in relation to the base portion about an axis essentially perpendicular to a major surface of the die;

a mirror formed from the layer of single-crystal silicon and a metallic coating having a mirror surface essentially parallel to the major surface of the die, the mirror being integrated with the pivoting member; and an actuator configured to rotate the pivoting member and mirror with respect to the base portion in response to a control signal.

23. A micro-electro-mechanical system ("MEMS") optical switch comprising:

a base portion of a die attached to a pivoting member formed in a layer of single-crystal silicon with a hinge formed of the layer of single-crystal silicon, the pivoting member rotating in relation to the base portion about an axis essentially perpendicular to a major surface of the die;

a mirror formed from the layer of single-crystal silicon and a reflective coating having a mirror surface essentially parallel to the major surface of the die, the mirror being integrated with the pivoting member;

a latching spring disposed between the base portion and the pivoting member to hold the pivoting member in one of a first position and a second position; and a magnetic drive including a first pole and a second pole disposed on the base portion, the first pale and the second pole forming a gap therebetween in at least the single-crystal silicon layer and further including a magnetic tab disposed on an arm movable within the gap.

* * * * *

UNITED STATES PATENT AND TRADEMARK OFFICE
CERTIFICATE OF CORRECTION

PATENT NO. : 6,801,681 B2
DATED : October 5, 2004
INVENTOR(S) : Feierabend et al.

It is certified that error appears in the above-identified patent and that said Letters Patent is hereby corrected as shown below:

Column 1,
Line 13, "Fejerabend" should read -- Feierabend --.

Column 8,
Line 48, "starts at to the" should read -- starts as $t_o$ the --.

Column 10,
Line 28, "and verify in" should read -- and rarify in --.

Column 13,
Line 65, "the binge is" should read -- the hinge is --.

Column 14,
Line 9, "essentially narallel to" should read -- essentially parallel to --.
Line 13, "the minor from" should read -- the mirror from --.
Line 23, "comnrising" should read -- comprising --.
Line 34, "from a first wherein" should read -- from a first switch position to a second switch position, wherein --.
Line 58, "the mirror arc" should read -- the mirror are --.

Column 16,
Line 51, "the first pale" should read -- the first pole --.

Signed and Sealed this

Fourth Day of October, 2005

JON W. DUDAS
*Director of the United States Patent and Trademark Office*